(12) United States Patent
Sakai et al.

(10) Patent No.: US 6,858,247 B2
(45) Date of Patent: Feb. 22, 2005

(54) FAT COMPOSITION

(75) Inventors: Hideaki Sakai, Tokyo (JP); Minoru Ishibashi, Tokyo (JP); Jun Kohori, Tokyo (JP)

(73) Assignee: Kao Corporation, Tokyo (JP)

( * ) Notice: Subject to any disclaimer, the term of this patent is extended or adjusted under 35 U.S.C. 154(b) by 54 days.

(21) Appl. No.: 10/014,449

(22) Filed: Dec. 14, 2001

(65) Prior Publication Data

US 2003/0044506 A1 Mar. 6, 2003

Related U.S. Application Data

(63) Continuation of application No. PCT/JP00/03632, filed on Jun. 5, 2000.

(30) Foreign Application Priority Data

Jun. 16, 1999 (JP) .......................................... 11/169404
Oct. 18, 1999 (JP) .......................................... 11/295302

(51) Int. Cl.$^7$ ................................................. A23D 9/00
(52) U.S. Cl. ........................ 426/611; 426/601; 426/438
(58) Field of Search ................................. 426/601, 611, 426/330.6, 438

(56) References Cited

U.S. PATENT DOCUMENTS

| | | | | |
|---|---|---|---|---|
| 3,619,213 A | * | 11/1971 | Haynes et al. ............... | 426/610 |
| 4,339,465 A | * | 7/1982 | Strouss ........................ | 426/293 |
| 4,363,823 A | * | 12/1982 | Kimura et al. ............... | 426/542 |
| 4,839,187 A | * | 6/1989 | Mai et al. .................... | 426/542 |
| 4,891,231 A | * | 1/1990 | Mai et al. .................... | 426/52 |
| 4,925,681 A | * | 5/1990 | Mai et al. .................... | 426/52 |
| 5,084,293 A | * | 1/1992 | Todd, Jr. ..................... | 426/541 |
| 5,102,659 A | | 4/1992 | Hudson | |
| 5,348,755 A | * | 9/1994 | Roy .............................. | 426/541 |
| 5,370,892 A | * | 12/1994 | El-Nokaly et al. .......... | 426/531 |
| 5,466,479 A | * | 11/1995 | Frye ............................. | 426/611 |
| 5,527,552 A | * | 6/1996 | Todd, Jr. ..................... | 426/541 |
| H1591 H | * | 9/1996 | Fulcher ....................... | 426/601 |
| 6,004,611 A | * | 12/1999 | Gotoh et al. ................. | 426/612 |
| 6,106,879 A | * | 8/2000 | Mori et al. ................... | 426/438 |
| 6,139,897 A | * | 10/2000 | Goto et al. ................... | 426/601 |
| 6,287,624 B1 | * | 9/2001 | Mori et al. ................... | 426/601 |
| 6,326,050 B1 | * | 12/2001 | Goto et al. ................... | 426/601 |
| 6,337,414 B1 | | 1/2002 | Sugiura et al. | |
| 6,365,211 B1 | * | 4/2002 | Corrigan ...................... | 426/116 |
| 6,497,908 B1 | * | 12/2002 | Oshiro ......................... | 426/238 |
| 2002/0045001 A1 | * | 4/2002 | El-Khoury et al. .......... | 426/611 |

FOREIGN PATENT DOCUMENTS

| | | |
|---|---|---|
| EP | 0 999 259 | 5/2000 |
| JP | 51-76303 | 7/1976 |
| JP | 55-89383 | 7/1980 |
| JP | 4-96992 | 3/1992 |
| JP | 9-111237 | 4/1997 |
| JP | 10-176181 | 6/1998 |
| JP | 10-195434 | 7/1998 |
| WO | WO 01/01787 | 1/2001 |
| WO | WO 01/15542 | 3/2001 |

OTHER PUBLICATIONS

C. Banias, et al., Journal of The American Oil Chemists, vol. 69, No. 6, pp. 520–524, XP–001120744, "The Effect of Primary Antioxidants and Synergists on the Activity of Plant Extracts in Lard", Jun. 1992.

M. H. Gordon, et al., Food Chemistry, vol. 52, pp. 175–177, XP–002229174, "Effect of Antioxidants on Losses of Tocopherols During Deep–Fat Frying", 1995.

* cited by examiner

*Primary Examiner*—Carolyn Paden
(74) *Attorney, Agent, or Firm*—Oblon, Spivak, McClelland, Maier & Neustadt, P.C.

(57) ABSTRACT

The invention provides a fat composition comprising:
- (A) a fat containing at least 15% by weight of diglycerides;
- (B) a fatty acid L-ascorbic ester; and
- (C) a component selected from among catechin, rosemary extract, sage extract and turmeric extract.

The fat composition is excellent in oxidation stability, flavor and appearance.

29 Claims, No Drawings

FAT COMPOSITION

This application is a continuation of prior International Application PCT/JP00/03632, filed Jun. 5, 2000.

BACKGROUND OF THE INVENTION

1. Field of the Invention

The present invention relates to a diglyceride-containing fat composition, excellent in oxidation stability, flavor, appearance and the like.

2. Discussion of the Background

Diglycerides can be oxidized by heating or storage for a long period of time, similar to triglycerides. Fat compositions for improving the oxidation stability of diglycerides, have been known. For example, a liquid general-purpose fat composition is reported in which ascorbyl palmitate and tocopherol are added to a fat composition containing diglycerides in a high proportion (Japanese Patent Application Laid-Open No. 176181/1998) and an edible fat composition in which an antioxidant extracted from a natural product such as green tea is incorporated into diglycerides (Japanese Patent Application Laid-Open No. 96992/1992).

However, the oxidation stability of the above-described fat compositions has been sufficient for household edible fats, but not always sufficient for institutional fats used under severe conditions. When the amounts of ascorbyl palmitate, tocopherol and the like are increased in order to further improve the oxidation stability of the above fat compositions, there has arisen a problem, the flavor and appearance of the fat compositions are deteriorated by the flavor and color tone of these substances.

It is therefore an object of the present invention to provide a diglyceride-containing fat composition which is excellent in oxidation stability and also excellent in flavor and appearance

SUMMARY OF THE INVENTION

The object of the present invention has been achieved by providing a fat composition comprising the following components (A), (B) and (C):

(A) a fat containing at least 15% by weight of diglycerides;
(B) a fatty acid L-ascorbate ester; and
(C) a component selected from the group consisting of catechin, rosemary extract, sage extract, turmeric extract and a mixture thereof.

In the fat composition according to the present invention, the oxidation stability of the diglyceride-containing fat is sharply improved by using (B) the fatty acid L-ascorbate ester and the component (C) such as catechin in combination. The oxidation stability of the diglyceride-containing fat can be improved to some extent by a combination of tocopherol and a fatty acid L-ascorbate ester, or the component (C) such as catechin. When the amount of such a component is increased for the purpose of further improving the oxidation stability, however, there has arisen a problem the appearance and flavor of the fats are deteriorated. However, it has not been known at all that when (B) the fatty acid L-ascorbate ester and the component (C) are incorporated into the diglyceride-containing fat in combination, both components act in combination and consequently the oxidation stability of the fat can be sharply improved and that since the incorporating amounts thereof can be controlled, sourness and puckery taste are not given and coloring is not caused, and consequently a fat composition preferable for edible oil can be provided. The reason why the components (B) and (C) act in combination on the diglyceride-containing fat is not always clearly known. However, it is inferred that a factor is that their action as an antioxidant is easy to be exhibited in the diglycerides because the polarity of the component (C) such as catechin and the fatty acid L-ascorbate ester is close to the polarity of the diglycerides compared with that of tocopherol, and both components are comparatively easy to be dissolved in the diglycerides.

DETAILED DESCRIPTION OF THE PREFERRED EMBODIMENTS

In the fat used in the present invention, the content of diglycerides is preferably at least 15% by weight (hereafter indicated merely by "%"), more preferably at least 30%, particularly preferably higher than 50%, based on the weight of the fat. The content of the diglycerides is preferably not higher than 95% from the viewpoint of production of the diglycerides. The content of monoglycerides is preferably not higher than 2%, particularly preferably not higher than 1.5%. The remainder in the fat is triglycerides. When the content of the diglycerides exceeds 50% in particular, a plain feeling of such a fat composition as an edible oil is more greatly improved, and moreover it may be used as a food material hard to put on fat in tempura, fries, margarine, mayonnaises, dressings, etc.

The number of carbon atoms in acyl groups constituting each of the diglycerides is preferably independently 8 to 24, particularly preferably 16 to 22. The amount of unsaturated acyl groups is preferably at least 55%, more preferably at least 70%, particularly preferably at least 90%, based on the total number of acyl groups. The diglycerides can be obtained by an optional process such as transesterification of a fat with glycerol or esterification of a fatty acid derived from such a fat with glycerol. The reaction method thereof may be either a chemical reaction method making use of an alkali catalyst or the like or a biochemical reaction method making use of a lipolytic enzyme such as lipase.

Examples of a fat used as a raw material for the diglyceride-containing fat include vegetable oils such as soybean oil, rapeseed oil, palm oil, rice oil or corn oil, animal oils such as beef tallow or fish oil, and hardened oils, fractionated oils and random transesterified oils thereof. It is preferred that a solid oil at normal temperature, for example, palm oil, or a hardened oil of any of various kinds of oils be used, since such effects that the oxidation stability of the diglyceride-containing fat is further improved, and oil spots on the surface of a food product fried with such a fat are also suppressed.

(B) The fatty acid L-ascorbate ester is preferably dissolved in the diglyceride-containing fat, more preferably the fatty acid L-ascorbate ester is a higher fatty acid ester, the number of carbon atoms of the acyl group in which is 12 to 22, particularly preferably L-ascorbyl palmitate or L-ascorbyl stearate, most preferably L-ascorbyl palmitate. The content of B) the fatty acid L-ascorbate ester in the fat composition according to the present invention is preferably at least 0.006%, more preferably 0.01 to 0.05%, particularly preferably 0.02 to 0.04%, based on the total weight of the fat composition, from the viewpoints of the improvement of oxidation stability, flavor and coloring.

Among the substances of the component (C), the catechin may be of either pyrrogallol type or catechol type, and examples thereof include epicatechin, epigallocatechin, epicatechin gallate and epigallocatechin gallate. At least one of these compounds may be used, or a catechin-containing plant such as a green tea leaf may be used by extracting it with hot water, or an organic solvent such as ethanol or chloroform and suitably concentrating, purifying and drying the resultant extract. From the viewpoint of further improving the oxidation stability, the ash content in catechin is at most 10%, preferably at most 5%, particularly preferably at most 2%, most preferably at most 1%, based on the weight of catechin. The cause that the oxidation stability is improved by the use of the catechin having a low ash content is not always clearly known. However, it is inferred that a factor is that when the content of ash (metals and the like) is low, the chelating ability of polyphenol is lowered. The term "ash" as used herein means salts containing potassium, phosphorus or the like. In the present invention, the ash content is a value measured in accordance with the ignition residue testing method described in Official Document Manual of Food Additives (Hirokawa Shoten, 1987). Examples of a method for lowering the ash content in catechin include a method of extracting green tea leaves with an organic solvent, a method of separating through a column and a method of additionally desalting after the process described above. As the catechin low in ash content, may also be used a commercially available product sold in the form of powder or a preparation thereof. Examples of commercially available catechin products having an ash content of at most 5% include "YK-85" (product of YMC Co.), "Sunphenone 100s" (product of Taiyo Kagaku Co., Ltd.), "Polyphenone 70S" (product of MITSUI NORIN CO., LTD.) and "Teafulon 90S" (product of Itoen K.K.).

The content of catechin in the fat composition according to the present invention is preferably at least 0.004%, more preferably 0.008 to 0.08%, particularly preferably 0.01 to 0.06% in terms of pure catechin, based on the total weight of the fat composition, from the viewpoint of imparting good antioxidant property to the fat composition.

Among the substances of the component (C), the rosemary extract and sage extract are products by respectively drying and grinding leaves of rosemary and sage which are plants of Lamiaceae, and extracting them with water, hot water, hexane, ethanol, acetone, ethyl acetate or a mixed solvent thereof. In the present invention, besides the above-described extracts with the organic solvent, oleo-resin preparations prepared from these extracts, or preparations of rosemanol, calsonol, isorosmarol, etc. which are constituents thereof may also be used. Products (hereinafter referred to as deodorized products) obtained by subjecting these extracts to a deodorizing treatment by a method under reduced pressure, a method under heating and reduced pressure, a supercritical extraction method, a column adsorption method or the like are particularly preferred from the viewpoint of flavor. The amount of a solvent remaining in these deodorized products is preferably at most 20 ppm, particularly preferably at most 15 ppm. Examples of commercially available rosemary extracts include Herbalox Type O, Herbalox Type HT-O, Herbalox Type 25, Duralox NMH and Duralox NM-1 (all, products of Kalsec Co.), and Reomi-ru E and Reomi-ru IO (both, product of Lion Corporation). Examples of commercially available sage extracts include Herbalox Type S-0 and Herbalox Type S-W (both, products of Kalsec Co.). Commercially available deodorized products include Herbalox Type HT-O (product of Kalsec Co.).

The content of these rosemary extracts or sage extracts in the fat composition according to the present invention is preferably 200 to 5,000 ppm, more preferably 500 to 3,500 ppm, particularly preferably 1,000 to 3,000 ppm, based on the total weight of the fat composition, in terms of dewatered and desolvated products from the viewpoint of imparting good antioxidant property to the fat composition.

Among the substances of the component (C), the turmeric extract is a product by drying and powdering rhizomes of turmeric (curcuma) which is a plant of Zingiberaceae, and extracting it with chloroform, methanol, hexane, ethanol or a mixed solvent thereof. In the present invention, besides the above-described extract with the organic solvent, oleo-resin preparations or curcumin preparations prepared from this extract may also be used. Examples of commercially available turmeric extracts include Turmeric Type 97, Turmeric Type 30 and Turmeric Extract (all, products of Kalsec Co.), and Curcumin Powder (product of Lion Corporation).

The content of the turmeric extract in the fat composition according to the present invention is preferably 50 to 1,000 ppm, particularly preferably 100 to 1,000 ppm in terms of curcumin, based on the total weight of the fat composition, from the viewpoint of imparting good antioxidant property to the fat composition.

In the present invention, the rosemary extract, sage extract and turmeric extract have effects of reducing smelling (oily smell) inherent in oil upon cooking and of preventing increase in acidic value (AV) that is caused by heating and hydrolysis of a fat itself. In particular, the deodorized products of the rosemary extract and sage extract are excellent in the effect of preventing the increase in AV.

When catechin and the fatty acid L-ascorbate ester are used, the mixing ratio (weight ratio) between them is preferably 0.03 to 3, more preferably 0.2 to 2, particularly preferably 0.5 to 1.5 in order to improve the effect by the combined use. The mixing ratio (weight ratio) of the rosemary extract or sage extract to the fatty acid L-ascorbate ester is preferably 1 to 20, more preferably 3 to 15, particularly preferably 5 to 10. The mixing ratio (weight ratio) of the turmeric extract to the fatty acid L-ascorbate ester is preferably 0.1 to 5, more preferably 0.2 to 3, particularly preferably 0.3 to 2. Incidentally, even if the component (C) and the fatty acid L-ascorbate ester are incorporated into a triglyceride, both components do not act in combination and no great oxidation-stabilizing effect is brought about.

Among the substances of the component (C), catechin and the rosemary extract are particularly preferred in the present invention. As the component (C), at least two of these substances may be used in combination.

The fat composition according to the present invention preferably further comprises silicone. The oxidation stability of the fat composition according to the present invention is still more greatly improved by containing the silicone in the composition, and the deterioration of flavor upon use of the fat composition is also improved. Examples of the silicone include preparations (KS-66, KS-69, KF-96, KM-72, etc., all products of Shin-Etsu Chemical Co., Ltd.; THF450, TSA737, etc., all products of Toshiba Silicone Co., Ltd.) known as antifoaming agents for food, such as dimethyl polysiloxane. The content of the silicone in the fat composition according to the present invention is preferably at least 0.00003%, particularly preferably 0.0001 to 0.001%, based on the total weight of the fat composition.

The fat composition according to the present invention may further comprise an antioxidant such as butylhydroxytoluene, butylhydroxyanisole, tocopherol or L-proline in addition to the above-described components.

The fat composition according to the present invention can be obtained by adding the components (B) and (C) and other components to the diglyceride-containing fat and suitably heating and stirring the resultant mixture. The components (B) and (C) may also be dissolved in a solvent such as ethanol in advance before the addition thereof.

The fat composition thus obtained is stable to long-time heating and storage and useful as, for example, an edible oil. The fat composition according to the present invention is also useful as an antioxidant that can improve the oxidation stability of an ordinary edible oil by adding it to the edible oil. The fat composition according to the present invention is suitable for use in producing fried confectionery of rice, wheat, corn, potato and sweet potato type, such as fried cookie, potato chips, fabricated potato and snack confectionery, fried potato, fried chicken, fries, doughnut, instant noodles, etc.

EXAMPLES

Examples 1 to 11 and Comparative Examples 1 to 11

A component (B), a component (C), vitamin E, L-ascorbic acid and/or silicone were added to a fat composed mainly of diglycerides or triglycerides in accordance with their corresponding compositions shown in Tables 1 and 2, and the resultant mixtures were separately stirred to produce respective fat compositions.

TABLE 1

| | Example | | | | | | | | | | |
|---|---|---|---|---|---|---|---|---|---|---|---|
| | 1 | 2 | 3 | 4 | 5 | 6 | 7 | 8 | 9 | 10 | 11 |
| High diglyceride-containing fat derived from soybean[1] | 100 g | 100 g | 100 g | 100 g | — | 100 g | — | — | — | — | — |
| High diglyceride-containing fat derived from rapeseed[2] | — | — | — | — | 100 g | — | 100 g | 100 g | 100 g | 100 g | 100 g |
| Palm oil | — | — | — | — | — | — | — | — | — | — | — |
| High triglyceride-containing fat derived from soybean[3] | — | — | — | — | — | — | — | — | — | — | — |
| Silicone[4] | 2 ppm | 2 ppm | 2 ppm | — | — | — | 2 ppm | 2 ppm | 2 ppm | 2 ppm | 2 ppm |
| L-Ascorbyl palmitate[5] | 250 ppm | 250 ppm | 250 ppm | 300 ppm | 300 ppm | 250 ppm | 250 ppm | 250 ppm | 250 ppm | 250 ppm | 250 ppm |
| L-Ascorbic acid[6] | — | — | — | — | — | — | — | — | — | — | — |
| Catechin[7] | 50 ppm | 100 ppm | 200 ppm | 200 ppm | 200 ppm | 100 ppm | — | — | — | — | — |
| Catechin[8] | — | — | — | — | — | — | 300 ppm | 500 ppm | — | — | — |
| Catechin[9] | — | — | — | — | — | — | — | — | — | — | — |
| Rosemary extract[10] | — | — | — | — | — | — | — | — | 2500 ppm | — | — |
| Sage extract[11] | — | — | — | — | — | — | — | — | — | 2500 ppm | — |
| Turmeric extract[12] | — | — | — | — | — | — | — | — | — | — | 250 ppm |

[1] Triglycerides 13.0%, diglycerides 86.9%, monoglyceride 0.1%.
[2] Triglycerides 14.2%, diglycerides 85.7%, monoglyceride 0.1%.
[3] "Soybean Oil" (product of Nisshin Oil Mills, Ltd.).
[4] "KS-86" (product of Shin-Etsu Chemical Co., Ltd.).
[7] "YM-85" (product of YMC Co.; catechin purity: 90%, ash content: 0.5%).
[8] "Thea-Flan 90S" (product of Itoen K.K.; catechin purity: 90%, ash content: 0.3%).
[9] "Thea-Flan 30S" (product of Itoen K.K.; catechin purity: 38%, ash content: 7.5%).
[10] "Herberlox HT-O" (product of Kalsec Co.).
[11] "Herberlox S-O" (product of Kalsec Co.).
[12] "Turmeric 30" (product of Kalsec Co.).
Numeric values in [4] to [12] indicate amounts incorporated into the respective fats.

TABLE 2

| | Comparative Example | | | | | | | | | | |
|---|---|---|---|---|---|---|---|---|---|---|---|
| | 1 | 2 | 3 | 4 | 5 | 6 | 7 | 8 | 9 | 10 | 11 |
| High diglyceride-containing fat derived from soybean[1] | 100 g | 100 g | 100 g | — | — | — | 100 g | 100 g | 100 g | 100 g | 100 g |
| High diglyceride-containing fat derived from rapeseed[2] | — | — | — | — | — | — | — | — | — | — | — |
| Palm oil | — | — | — | — | — | 100 g | — | — | — | — | — |
| High triglyceride-containing fat derived from soybean[3] | — | — | — | 100 g | 100 g | — | — | — | — | — | — |
| Silicone[4] | 2 ppm | 2 ppm | 2 ppm | 2 ppm | 2 ppm | 2 ppm | 2 ppm | 2 ppm | 2 ppm | 2 ppm | 2 ppm |
| L-Ascorbyl palmitate[5] | — | 250 ppm | 300 ppm | — | 250 ppm | — | — | — | — | — | — |
| L-Ascorbic acid[6] | — | — | — | — | — | — | — | 250 ppm | — | — | — |

TABLE 2-continued

|  | Comparative Example | | | | | | | | | | |
|---|---|---|---|---|---|---|---|---|---|---|---|
|  | 1 | 2 | 3 | 4 | 5 | 6 | 7 | 8 | 9 | 10 | 11 |
| Catechin[7] | — | — | — | — | 100 ppm | — | — | — | — | — | — |
| Catechin[8] | — | — | — | — | — | — | — | — | — | — | — |
| Catechin[9] | — | — | — | — | — | — | 400 ppm | 100 ppm | — | — | — |
| Rosemary extract[10] | — | — | — | — | — | — | — | — | 2500 ppm | — | — |
| Sage extract[11] | — | — | — | — | — | — | — | — | — | 2500 ppm | — |
| Turmeric extract[12] | — | — | — | — | — | — | — | — | — | — | 250 ppm |
| Vitamin E[13] | — | — | 2000 ppm | — | — | — | — | — | — | — | — |

[1] to [12] are the same as those described in Table 1.
Numeric values in [4] to [13] indicate amounts incorporated into the respective fats.

Test Example 1

With respect to the respective fat compositions prepared above, the induction time was determined in accordance with the following method (CDM test: Standard oils and fats analyzing test method (edited by The Japan Oil Chemists' Society). More specifically, while a sample was heated to 120° C. in a reaction vessel, clean air was introduced to collect volatile decomposition products formed by oxidation in water, thereby measuring the time (hr) up to a turning point where the electric conductivity of water rapidly changed. The fat compositions were evaluated as to flavor and appearance in accordance with the following respective evaluation standards. The results are shown in Table 3.

(Flavor)
⊚: Far excellent because no unpleasant taste such as sourness or puckery taste was observed;
○: Excellent because an unpleasant taste was scarcely observed;
Δ: An unpleasant taste such as sourness or puckery taste was somewhat observed;
X: Poor because an unpleasant taste was observed.

(Appearance)
○: Good because neither insoluble matter nor coloring was observed;
X: Poor because insoluble matter or coloring was observed.

Each of these fat compositions was used to fry tempura repeatedly 30 times, and the thirtieth tempura was evaluated as to flavor. The results are shown in Table 3. The cooking method and evaluation method of the tempura are as follows:

(Cooking of Tempura)
Coating of tempura: egg/water/soft flour=50/150/100
Cooker and amount of oil:
  Oil (600 g) was put into a Chinese pan having a diameter of 30 cm. On and after the second cooking, the oil decreased was supplied to conduct cooking.
Oil temperature: 180° C.
Material: Four prawns, and each 4 pieces of pimento, lotus root, pumpkin and eggplant.

(Evaluation Method)
Ten panelists (Flavor of Cooked Product)
⊚: Far excellent because no unpleasant taste due to deterioration of the fat was observed;
○: Excellent because an unpleasant taste due to deterioration of the fat was scarcely observed;
Δ: An unpleasant taste due to deterioration of the fat was somewhat observed;
X: Poor because an unpleasant taste due to deterioration of the fat was observed.

TABLE 3

|  | Induction time (hr) | Flavor of fat composition | Appearance | Flavor of cooked product |
|---|---|---|---|---|
| Ex. 1 | 8.4 | ⊚ | ○ | ⊚ |
| Ex. 2 | 13.5 | ⊚ | ○ | ⊚ |
| Ex. 3 | 20.7 | ○ | ○ | ⊚ |
| Ex. 4 | 20.7 | ○ | ○ | ○ |
| Ex. 5 | 20.9 | ○ | ○ | ○ |
| Ex. 6 | 13.4 | ⊚ | ○ | ○ |
| Ex. 7 | 23.4 | ○ | ○ | ⊚ |
| Ex. 8 | 24.9 | ○ | ○ | ⊚ |
| Ex. 9 | 21.5 | ⊚ | ○ | ⊚ |
| Ex. 10 | 21.3 | ⊚ | ○ | ⊚ |
| Ex. 11 | 9.3 | ⊚ | ○ | ○ |
| Comp. Ex. 1 | 3.5 | ⊚ | ○ | Δ |
| Comp. Ex. 2 | 5.5 | ⊚ | ○ | Δ |
| Comp. Ex. 3 | 6.9 | ⊚ | ○ | Δ |
| Comp. Ex. 4 | 3.9 | ⊚ | ○ | Δ |
| Comp. Ex. 5 | 7.4 | ⊚ | X | Δ |
| Comp. Ex. 6 | 18.9 | ⊚ | ○ | ○ |
| Comp. Ex. 7 | 4.6 | ⊚ | ○ | Δ |
| Comp. Ex. 8 | 4.7 | ⊚ | X | Δ |
| Comp. Ex. 9 | 5.4 | ⊚ | ○ | Δ |
| Comp. Ex. 10 | 5.2 | ⊚ | ○ | Δ |
| Comp. Ex. 11 | 3.5 | ⊚ | ○ | Δ |

The fat composition of Comparative Example 6 was a hardened fat composed mainly of triglycerides and very high in oxidation stability. The fat compositions of Comparative Examples 1, 4 and 8 were very low in oxidation stability. The fat composition of Comparative Example 8 was very poor in appearance because L-ascorbic acid was not dissolved. The fat composition of Comparative Example 2 was improved in oxidation stability compared with the fat composition of Comparative Example 1, but the effects thereof were not always sufficient. Comparative Example 2 indicates that even if the fatty acid L-ascorbate ester is incorporated by itself, the oxidation stability is not sufficiently improved. The fat composition of Comparative Example 3 was improved in oxidation stability compared with the fat composition of Comparative Example 1, but the effects thereof were not always sufficient. The fat composition of Comparative Example 5 was good in flavor, but poor in appearance because catechin and L-ascorbyl palmitate were not completely dissolved, and the oxidation stability-improving effect thereof was low. Comparative Example 5 indicates that even if catechin and L-ascorbyl palmitate were incorporated into the fat composed mainly of triglycerides, the effect by the combined use thereof is not sufficient.

Comparative Example 7 indicates that even if catechin having an ash content exceeding 5% is used without being combined with the Fatty acid L-ascorbate ester, the improvement in oxidation stability of the fat composition is insufficient.

On the other hand, all the fat compositions according to Examples 1 to 11 were improved in oxidation stability by leaps and bounds compared with the fat composition of Comparative Example 1. Among these, the fat compositions of Examples 2 to 10 making combined use of catechin having an ash content not higher than 5%, or the rosemary extract or sage extract and the fatty acid L-ascorbate ester and the fat composition of Example 11 were far excellent. In particular, the fat compositions of Examples 3 to 5 and 7 to 10 were superior in oxidation stability to the fat composition of Comparative Example 6. All the fat compositions according to Examples 1 to 11 were excellent in flavor and appearance.

Test Example 2

Each of the fat compositions prepared in Examples 1, 2 and 9 and Comparative Example 1 was used to make the following cooking evaluation.

(Evaluation in Fried Potato)

Each of the above-described fat compositions was used to produce fried potato repeatedly 100 times in accordance with the following process, and the hundredth fried potato was evaluated as to flavor.

Cooker and amount of oil:

Oil (23 kg) was put into a gas fryer (FG-400 type, manufactured by Tsuji Kikai K.K.).

The oil decreased was supplied every 10 frying operations.

Oil temperature: 180° C.

Material:

After potatoes (DANSHAKU IMO) were each washed with water with the skin on, vertically cut in a comb-like form into 4 to 6 pieces, the pieces were exposed to water for 15 minutes. Thereafter, water on the surface of each piece was fully wiped off to provide materials.

Frying

In an operation, pieces (500 g) of potato were fried for 6 minutes in the oil to obtain fried potato.

(Evaluation in Fried Chicken)

Each of the above-described fat compositions was used to produce fried chicken repeatedly 100 times in accordance with the following process, and the hundredth fried chicken was evaluated as to flavor.

Cooker and amount of oil:

Oil (10 kg) was put into an electric fryer (SEF-D9A type, manufactured by Sanyo Electric Co., Ltd.). The oil decreased was supplied every 10 frying operations.

Oil temperature: 170° C.

Material:

After chicken was cut into bite-sized pieces, to which small amounts of common salt, pepper and lemon juice were added, and the mixture was fully stirred, the chicken pieces were coated with wheat flour to provide materials.

Frying

In an operation, the chicken pieces (200 g) were fried for 7 minutes in the oil to obtain fried chicken.

(Evaluation in Doughnut)

Each of the above-described fat compositions was used to produce doughnut repeatedly 100 times in accordance with the following process, and the hundredth doughnut was evaluated as to flavor.

Cooker and amount of oil:

Oil (10 kg) was put into an electric fryer (SEF-D9A type, manufactured by Sanyo Electric Co., Ltd.). The oil decreased was supplied every 10 frying operations.

Oil temperature: 180° C.

Material:

Sugar (30 parts by weight; hereinafter indicated merely by "parts"), shortening for kneading (New Econa, product of Kao Corporation; 8 parts) and common salt (1 part) were mixed, and the mixture was stirred in a vertical mixer equipped with a beater. While gradually adding egg (20 parts) and water (35 parts), the mixture was then stirred until the mixture became creamy. Soft flour (80 parts), strong flour (20 parts) and baking powder (3 parts) were added, and the resultant mixture was stirred for 90 seconds. After the resultant dough was left to stand at room temperature for 20 minutes, it was rolled to a thickness of about 1 cm and punched by a punching die for doughnut to provide materials.

Frying

In an operation, 5 punched pieces of the dough were fried for 7 minutes in the oil while sometimes reversing, thereby obtaining doughnut.

(Evaluation in Potato Chips)

Each of the above-described fat compositions was used to produce potato chips repeatedly 140 times in accordance with the following process, and the 140th potato chips were evaluated as to flavor and packaged with an aluminum foil laminate to evaluate the potato chips as to flavor after storing them for 1 month.

Cooker and amount of oil:

Oil (23 kg) was put into a gas fryer (FG-400 type, manufactured by Tsuji Kikai K.K.). The oil decreased was supplied every 10 frying operations.

Oil temperature: 180° C.

Material:

After potatoes (DANSHAKU IMO) were each peeled, sliced to a thickness of 1.5 mm, and washed with water and hot water in accordance a method known per se in the art to remove starch on the surface of each slice and soluble matter. Water on the surface was wiped off to provide materials.

Frying

In an operation, slices (500 g) of potato were fried for 2.5 minutes in the oil to obtain potato chips.

Storing conditions:

Condition (1) temperature 20° C., humidity 65±5%, 1 month;

Condition (2) temperature 40° C., humidity 75±5%, 1 month (Evaluation in Instant Noodles (Bagged Noodles))

Each of the above-described fat compositions was used to produce instant noodles repeatedly 140 times in accordance with the following process, and the 140th instant noodles were evaluated as to flavor and packaged into a bag made of polypropylene to evaluate the instant noodles as to flavor after storing them for 1 month.

Cooker and amount of oil:
Oil (23 kg) was put into a gas fryer (FG-400 type, manufactured by Tsuji Kikai K.K.). The oil decreased was supplied every 10 flying operations.
Oil temperature: 150° C.
Material:
After brackish water (30 g; obtained by dissolving 4 g of brackish water powder in 1 L of water) was added to wheat flour (100 g), and they were mixed for 10 minutes, the mixture was combined and rolled repeatedly in a noodle-making machine (XIR type, manufactured by Suzuki Menki K.K.) and cut by a cutting blade No. 18 to obtain noodles having a section of about 1.7 mm square. Thereafter the noodles were steamed for 1 minute in accordance with a method known per se in the art and allowed to cool to provide materials (steamed noodles).
Frying
In an operation, the steamed noodles (50 g×10 samples) were fried for 1 minutes in the oil to obtain instant noodles.
Storing conditions:
Condition (1) temperature 20° C., humidity 65±5%, 1 month;
Condition (2) temperature 40° C., humidity 75±5%, 1 month
Reconstituting conditions with boiling water:
A sample of the instant noodles thus obtained was placed into boiling water (100 g) and continuously heated for 3 minutes as it is.

(Evaluation in Instant Noodles (Cupped Noodles))

Each of the above-described fat compositions was used to produce instant noodles repeatedly 140 times in accordance with the following process, and the 140th instant noodles were evaluated as to flavor and packaged into a container made of foamed polypropylene to evaluate the instant noodles as to flavor after storing them for 1 month.
Cooker and amount of oil:
Oil (23 kg) was put into a gas fryer (FG-400 type, manufactured by Tsuji Kikai K.K.). The oil decreased was supplied every 10 frying operations.
Oil temperature: 150° C.
Material:
After brackish water (30 g; obtained by dissolving 4 g of brackish water powder in 1 L of water) was added to wheat flour (100 g), and they were mixed for 10 minutes, the mixture was combined and rolled repeatedly in a noodle-making machine (XIR type, manufactured by Suzuki Menki K.K.) and cut by a cutting blade No. 22 to obtain noodles having a section of about 1.4 mm square. Thereafter the noodles were steamed for 1 minute in accordance with a method known per se in the art and allowed to cool to provide materials (steamed noodles).
Frying
In an operation, the steamed noodles (50 g×10 samples) were fried for 1 minutes in the oil to obtain instant noodles.
Storing conditions:
Condition (1) temperature 20° C., humidity 65±5%, 1 month;
Condition (2) temperature 40° C., humidity 75±5%, 1 month
Reconstituting conditions with boiling water:
Boiling water (100 g) was poured into the container of the cupped noodles thus obtained, and the noodles were left to stand for 3 minutes as it is.

(Evaluation as to Flavor)

The evaluation was made in the same manner as in Test Example 1.

TABLE 4

| Fat composition used | Flavor of fried potato | Flavor of fried chicken | Flavor of doughnut | Potato chip ||| Instant noodle (bagged noodle) ||| Instant noodle (cupped noodle) |||
|---|---|---|---|---|---|---|---|---|---|---|---|---|
| | | | | Flavor of cooked product | Flavor of product stored under condition (1) | Flavor of product stored under condition (2) | Flavor of cooked product | Flavor of product stored under condition (1) | Flavor of product stored under condition (2) | Flavor of cooked product | Flavor of product stored under condition (1) | Flavor of product stored under condition (2) |
| Fat composition of Ex. 1 | ⊙ | ⊙ | ⊙ | ⊙ | ⊙ | ○ | ⊙ | ⊙ | ○ | ⊙ | ⊙ | ○ |
| Fat composition of Ex. 2 | ⊙ | ⊙ | ⊙ | ⊙ | ⊙ | ○ | ⊙ | ⊙ | ○ | ⊙ | ⊙ | ○ |
| Fat composition of Ex. 9 | ⊙ | ⊙ | ⊙ | ⊙ | ⊙ | ○ | ⊙ | ⊙ | ○ | ⊙ | ⊙ | ○ |
| Fat composition of Comp. Ex. 1 | Δ | Δ | Δ | Δ | X | X | Δ | X | X | Δ | X | X |

When the fat composition according to Example 1, 2 or 9 was used, all the cooked products obtained were excellent flavor. With respect to the potato chips and instant noodles (bagged noodles and cupped noodles), the flavor was scarcely deteriorated even after stored for 1 month. On the other hand, when the fat composition of Comparative Example 1 was used, all the cooked products, were not very good in flavor. In particular, the flavor of the potato chips and instant noodles (bagged noodles and cupped noodles) was markedly deteriorated by storage for 1 month.

Industrial Applicability

The fat compositions according to the present invention are hard to be oxidized even when heated or stored for a long period of time and also excellent in flavor and appearance. Accordingly, they are particularly useful as food materials for business and the like. Although only solid hardened fats have heretofore been present as fat compositions very high in oxidation stability, the fat compositions according to the present invention are liquid at normal temperature though their oxidation stability is very high, and so they are also excellent in handling property and workability.

This application is based on Japanese patent applications JP 11/169404 and JP 11/295302 filed in the Japanese Patent Office on Jun. 6, 1999 and Oct. 18, 1999, and PCT/JP00/03632 filed with the Japanese receiving office of the World intellectual Property Organization on Jun. 5, 2000, the entire contents of each of which are hereby incorporated by reference.

What is claimed as new and desired to be secured by Letters Patent of the United States is:

1. A fat composition comprising:
   (A) a fat containing at least 15% by weight of diglycerides;
   (B) a fatty acid L-ascorbic ester; and
   (C) at least one component selected from among catechin, sage extract and turmeric extract.

2. The fat composition of claim 1, wherein component (C) is a catechin having an ash content of at most 5% by weight.

3. The fat composition of claim 1, which further comprises silicone.

4. The fat composition of claim 1, wherein said fat is selected from the group consisting of vegetable oil, animal oil, hardened oils, fractionated oils, random transesterified oils thereof and mixtures thereof.

5. The fat composition of claim 1, wherein said fat is selected from the group consisting of soybean oil, rapeseed oil, palm oil, rice oil, corn oil, beef tallow, fish oil, hardened oils, fractionated oils, random transesterified oils thereof and mixtures thereof.

6. The fat composition of claim 1, wherein said fatty acid L-ascorbic ester is selected from the group consisting of L-ascorbyl palmitate, L-ascorbyl stearate and a mixture thereof.

7. The fat composition of claim 1, wherein said fatty acid L-ascorbic ester is present in an amount of at least 0.006 wt. %.

8. The fat composition of claim 1, wherein said fatty acid L-ascorbic ester is present in an amount of 0.01 to 0.05 wt. %.

9. The fat composition of claim 1, wherein said fatty acid L-ascorbic ester is present in an amount of 0.02 to 0.04 wt. %.

10. The fat composition of claim 1, wherein component (C) is a catechin selected from the group consisting of epicatechin, epigallocatechin, epicatechin gallate, epigallocatechin gallate and a mixture thereof.

11. The fat composition of claim 10, wherein said catechin is present in an amount of at least 0.004 wt %.

12. The fat composition of claim 10, wherein said catechin is present in an amount of 0.008 to 0.08 wt. %.

13. The fat composition of claim 1, wherein component (C) is a turmeric extract present in an amount of 50 to 1,000 ppm.

14. The fat composition of claim 13, wherein said turmeric extract is present in an amount of 100 to 1,000 ppm.

15. The fat composition of claim 1, wherein said catechin and said fatty acid L-ascorbate ester are used, in a weight ratio of 0.03 to 3.

16. The fat composition of claim 1 wherein component (C) is turmeric extract and said turmeric extract and said fatty acid L-ascorbate ester are used in a weight ratio of 0.1 to 5.

17. A method of producing a confectionary selected from the group consisting of fried rice, fried wheat, fried corn, fried potato, fried sweet potato, fried chicken, fries, doughnut, instant noodles comprising heating a confectionary selected from the group consisting of rice, wheat, corn, potato, sweet potato, chicken, dough, in the fat composition of claim 1.

18. A fat composition comprising:
   (A) a fat containing at least 15% by weight of diglycerides;
   (B) a fatty acid L-ascorbic ester; and
   (C) at least one component selected from among rosemary extract and sage extract present in an amount of 200 to 5,000 ppm
   wherein said rosemary extract or sage extract and said fatty acid L-ascorbate ester are used in a weight ratio of 1 to 20.

19. A fat composition comprising:
   (A) a fat containing at least 15% by weight of diglycerides;
   (B) 0.006 wt. % or more of a fatty acid L-ascorbic ester;
   (C) at least one component selected from among at least 0.004 wt. % of catechin, 200–5000 ppm of rosemary extract, 200–5000 ppm of sage extract and 50–1000 ppm of turmeric extract; and
   (D) 0.00003 wt. % or more of silicone.

20. The fat composition of claim 19, wherein component (C) is a rosemary extract or a sage extract present in an amount of 500 to 3,500 ppm.

21. The fat composition of claim 19, wherein said fat is selected from the group consisting of vegetable oil, animal oil, hardened oils, fractionated oils, random transesterified oils thereof and mixtures thereof.

22. The fat composition of claim 19, wherein said fat is selected from the group consisting of soybean oil, rapeseed oil, palm oil, rice oil, corn oil, beef tallow, fish oil, hardened oils, fractionated oils, random transesterified oils thereof and mixtures thereof.

23. A method of producing a confectionary selected from the group consisting of fried rice, fried wheat, fried corn, fried potato, fried sweet potato, fried chicken, fries, doughnut, instant noodles comprising heating a confectionary selected from the group consisting of rice, wheat, corn, potato, sweet potato, chicken, dough, in the fat composition of claim 19.

24. The fat composition of claim 19, wherein said fatty acid L-ascorbic ester is selected from the group consisting of L-ascorbyl palmitate, L-ascorbyl stearate and a mixture thereof.

25. The fat composition of claim 19, wherein said fatty acid L-ascorbic ester is present in an amount of 0.01 to 0.05 wt. %.

26. The fat composition of claim 19, wherein said fatty acid L-ascorbic ester is present in an amount of 0.02 to 0.04 wt. %.

27. A fat composition comprising:
   (A) a fat containing at least 15% by weight of diglycerides;
   (B) a fatty acid L-ascorbic ester; and
   (C) at least one component selected from among rosemary extract and sage extract present in an amount of 200 to 5,000 ppm.,
   wherein said fatty acid L-ascorbic ester is present in an amount of at least 0.006 wt. %.

28. A fat composition comprising:
   (A) a fat containing at least 15% by weight of diglycerides;
   (B) a fatty acid L-ascorbic ester; and
   (C) at least one component selected from among rosemary extract and sage extract present in an amount of 200 to 5,000 ppm,
   wherein said fatty acid L-ascorbic ester is present in an amount of 0.01 to 0.05 wt. %.

29. A fat composition comprising:
   (A) a fat containing at least 15% by weight of diglycerides;
   (B) a fatty acid L-ascorbic ester; and
   (C) at least one component selected from among rosemary extract and sage extract present in an amount of 200 to 5,000 ppm,
   wherein said fatty acid L-ascorbic ester is present in an amount of 0.02 to 0.04 wt. %.

* * * * *